United States Patent [19]
Marlin

[11] Patent Number: 5,273,701
[45] Date of Patent: Dec. 28, 1993

[54] PROCESS TO REMOVE A LAYER OF THERMOPLASTIC MATERIAL DEPOSITED ON A SUBSTRATE

[75] Inventor: Pascal Marlin, Cambes en Plaine, France

[73] Assignee: L'Air Liquid, Societe Anonyme pour l'Etude et l'Exploitation des Procedes Georges Claude, Paris, France

[21] Appl. No.: 844,754

[22] Filed: Mar. 2, 1992

[30] Foreign Application Priority Data

Mar. 1, 1991 [FR] France ................. 91 02465

[51] Int. Cl.$^5$ ............................................. B05D 3/04
[52] U.S. Cl. .................... 264/85; 264/139; 264/500; 427/271; 427/348; 156/268; 156/497
[58] Field of Search ............ 264/80, 85, 500, 510, 264/544, 555, 139, 504; 156/257, 268, 497, 82; 427/264, 271, 348, 378

[56] References Cited

U.S. PATENT DOCUMENTS

| | | | |
|---|---|---|---|
| 2,396,946 | 3/1946 | Grupe | 427/348 |
| 3,924,794 | 12/1975 | Allen et al. | 228/256 |
| 4,416,919 | 11/1983 | Beck | 427/348 |
| 4,834,826 | 5/1989 | Abe et al. | 156/497 |
| 4,975,303 | 12/1990 | McKinnon | 427/264 |

FOREIGN PATENT DOCUMENTS

| | | | |
|---|---|---|---|
| 233019 | 2/1961 | Australia | 264/504 |
| 0225570 | 6/1987 | European Pat. Off. | |
| 2105484 | 8/1972 | Fed. Rep. of Germany | 427/348 |
| 58-96517 | 6/1983 | Japan | |
| 58-118207 | 7/1983 | Japan | |
| 63-202409 | 8/1988 | Japan | |
| 2-139932 | 5/1990 | Japan | |

Primary Examiner—Catherine Timm
Attorney, Agent, or Firm—Young & Thompson

[57] ABSTRACT

To remove a layer of thermoplastic material, particularly of polyethylene, adhering to a substrate, particularly a strip of aluminum, there is directed against a region of the layer of thermoplastic material (2) a shaped jet (10) of hot inert gas, containing for example principally helium, to melt the thermoplastic material and the jet is displaced relative to the coated substrate to push back (11) the melted thermoplastic material. The gas or the gaseous between 300° C. and 700° C., by an electric resistance (20), adjacent the ejection nozzle (4).

10 Claims, 1 Drawing Sheet

PROCESS TO REMOVE A LAYER OF THERMOPLASTIC MATERIAL DEPOSITED ON A SUBSTRATE

FIELD OF THE INVENTION

The present invention relates to a process for stripping a region of a substrate coated with an adherent layer of thermoplastic material.

BACKGROUND OF THE INVENTION

Numerous substrates or structural elements, particularly metallic ones, are coated with an adherent layer of thermoplastic material for protection or insulation having a thickness between about 100 microns and 1 millimeter, and to be able to work, for example to assemble, the coated substrate, it is necessary to remove, at least locally, the layer of thermoplastic material. This layer of plastic material could be mechanically removed, by cutting off and stripping or pushing back but the process now most commonly used is a chemical process by immersing the coated substrate in a hot acid bath. These two techniques are long and difficult to practice, relatively cumbersome, and require skilled personnel.

SUMMARY OF THE INVENTION

The present invention has for its object to provide a process of the type mentioned above which is particularly simple and quick to perform, of little difficulty, not requiring skilled operations and permitting continuous automation.

To do this, according to a characteristic of the invention, the process comprises the steps of directing against a region of the layer of thermoplastic material, at an angle relative to a direction orthogonal to the region, a shaped jet of hot inert gas, typically in the shape of a sheet, and to effect relative displacement of the jet and the coated substrate to push back the melted thermoplastic material.

According to more particular aspects of the invention, the inert gas contains mostly helium and the temperature of the ejected inert gas is between 300° and 700° C.

Apparatus for practicing the process comprises at least one shaped nozzle for projecting a gas jet, connected to a source of inert gas via a circuit comprising heating means, constituted preferably by an electric resistance disposed in the circuit, adjacent the nozzle, which is preferably of a shape corresponding to that of the substrate to be stripped, and particularly in the form of a slot for denuding strips.

BRIEF DESCRIPTION OF THE DRAWINGS

Other characteristics and advantages of the present invention will appear from the following description of embodiments, given by way of example but not at all limiting, with respect to the accompanying drawings, in which.

DETAILED DESCRIPTION OF THE INVENTION

Figure 1:
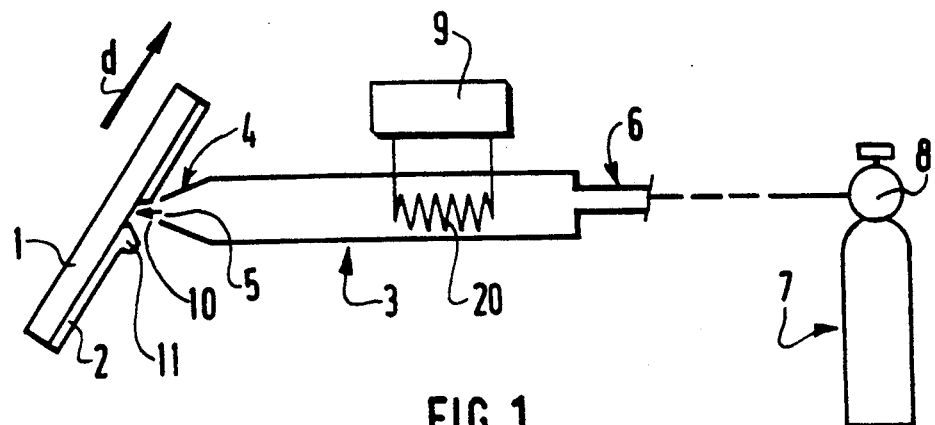
FIG. 1 shows schematically an apparatus for practicing the process according to the invention.

There is shown in FIG. 1 a substrate for example metallic, covered with a layer of thermoplastic material 2 in juxtaposition with an apparatus according to the invention, constituted essentially by a projection head 3 for gas comprising, at one end, a projection nozzle 4 provided with a shaped outlet opening 5 and connected by a conduit 6 to a source of gas 7, in this case a tank of gaseous mixture under pressure provided with an expander 8. The head 3 comprises a heating resistance 20 disposed in the path of the gas between the conduit 6 and the outlet 5 and whose temperature is regulated by an electronic control unit 9.

To strip the surface of the substrate 1, the nozzle 4 is disposed adjacent the coated region of the substrate 1 and a current of gas from source 7 heated by resistance 20 is ejected by outlet 5 in the form of a sheet of gas, as shown by arrow 10, against the layer of thermoplastic material so as to melt and loosen locally this latter from the substrate 1. Typically, the gas jet 10 is oriented at an angle relative to a direction orthogonal to the impact region so as to form laterally a ridge of melted thermoplastic material 11 and the coated substrate is displaced relative to the head 3 in the direction shown by arrow D, such that the jet 10 maintains the melted condition of ridge 11 and continuously presses back this latter relative to the progressively stripped surface of the substrate 1.

According to an aspect of the invention, the gas utilized is an inert gas or mixture of gases selected from the group comprising nitrogen, helium, argon and their mixtures, preferably a mixture of helium with one of the other gases containing between 50 and 90% helium. The temperature of the gas is comprised between the melting temperature of the thermoplastic material and the softening temperature of the substrate, typically between 300° C. and 700° C.

Figure 2:
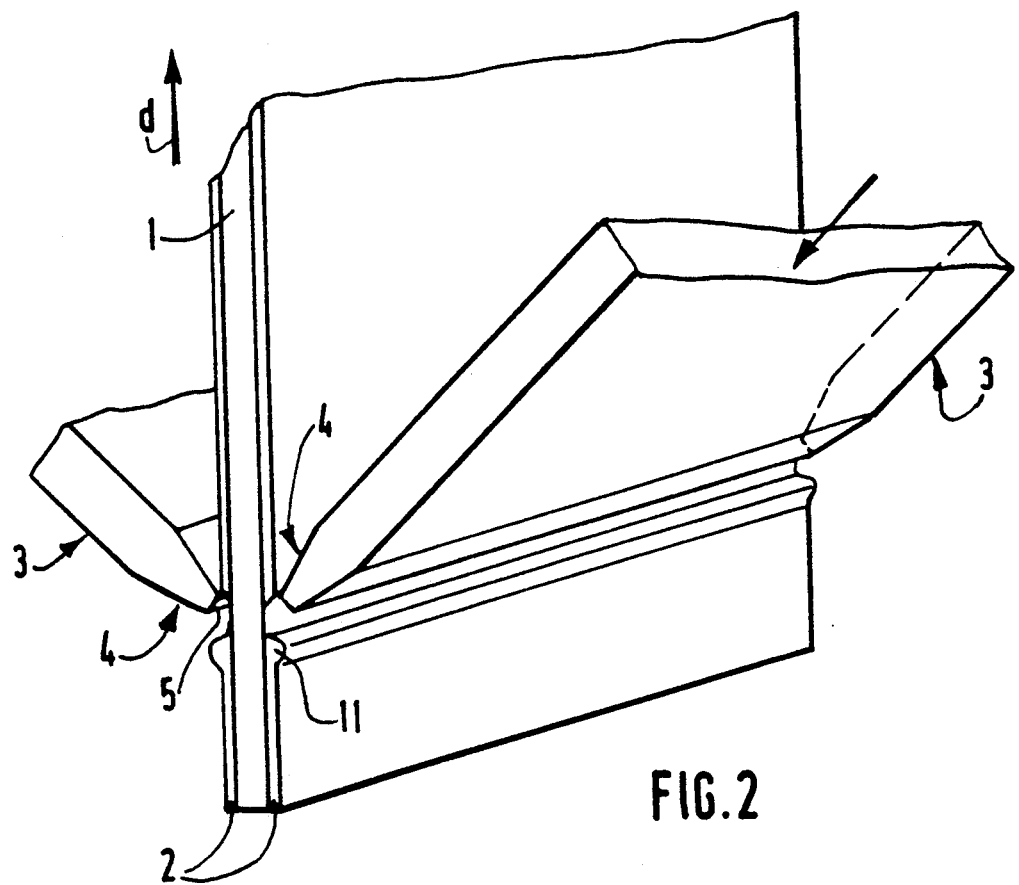
FIG. 2 is a perspective view of a detail of a particular embodiment of an apparatus according to the invention.

There is shown in FIG. 2 an embodiment of an apparatus according to the invention adapted to denude a metallic strip coated on its two faces with a layer of material coated on each face with a film of high-density polyethylene. Such strips are used in the fabrication of electromagnetic shields for electrical cables whose length requires joining end to end several strips secured together by welding, particularly ultrasonically. To effect this welding, it is necessary to remove the coating on the two surfaces, the region of removed coating being restored after welding. As is seen from FIG. 2, the apparatus according to the invention accordingly comprises two heads 3 disposed symmetrically on opposite sides of the coated strip 1 and each having an oblong nozzle 4 with an outlet slot 5 of a length corresponding substantially to the width of the surface to be denuded of the strip 1 and ejecting the gas in the form of a sheet having the same lateral extent.

In this particular application, if pure nitrogen at a temperature higher than 600° C. gives satisfactory results, the best results are obtained with pure helium at a temperature between 400° and 600° C. and with mixtures of helium-argon and helium-nitrogen comprising at least 50% helium at a temperature between 450° and 600° C. The pressure of the gaseous mixture delivered by the expander 8 is adjusted to a very low value, of the order of $1.1 \times 10^5$ Pa and, for a flow rate of about 10 m$^3$/h, there is effected the stripping of the surfaces of the strips comprised between 900 and 10,000 mm$^2$ during a time period comprised between 1 and 3 minutes.

I claim:

1. A method of stripping an area of a surface of a substrate which is coated with an adherent layer of thermoplastic covering material, comprising the steps of forming a shaped jet of a hot inert gas using a slot-shaped nozzle, causing the jet to impinge on the coated surface at an angle relative to a direction orthogonal to the surface to cause the material of the adherent layer to locally melt and form a ridge of melted thermoplastic material, and displacing the jet and the coated surface relative to each other so that the jet maintains the ridge in a melted condition and continuously presses back the ridge, thereby leaving the area of the surface having passed the jet free from the covering material.

2. The method of claim 1, wherein the inert gas is selected from the group consisting of nitrogen, helium, argon and mixtures thereof.

3. The method of claim 2, wherein the inert gas contains mostly helium.

4. The method of claim 2, wherein the substrate is metallic.

5. The method of claim 4, wherein the substrate is a metal sheet having at least one side surface totally coated with an adherent layer of the covering material and wherein the shaped jet is in the form of a sheet.

6. The method of claim 5, wherein the sheet-shaped jet is formed by a nozzle having an ejection slot arranged adjacent to the side surface.

7. The method of claim 6, wherein the nozzle is supplied with a flow of inert gas from a source of cold inert gas, and the flow of inert gas is heated upstream of the ejection slot.

8. A method of stripping an area of a surface of an elongated substrate which is coated with an adherent layer of protecting thermoplastic material, comprising the steps of forming a jet of hot inert gas with a nozzle having a slot substantially corresponding to the shape of the surface area to be stripped, causing the jet to impinge at an acute angle relative to a direction orthogonal to the layer so as to melt said layer and form a ridge of melted thermoplastic material, and displacing the jet and the coated substrate relative to each other to maintain the ridge in a melted condition and press back the ridge, whereby the melted layer is progressively repelled by the jet, thereby leaving exposed the area of the surface of the substrate having passed the jet.

9. The method of claim 8, wherein the surface is substantially flat and the jet has the shape of a sheet.

10. The method of claim 8, wherein the substrate is metallic.

* * * * *